United States Patent
Ellis et al.

(10) Patent No.: US 8,794,921 B2
(45) Date of Patent: Aug. 5, 2014

(54) APPARATUS AND METHODS FOR COOLING PLATFORM REGIONS OF TURBINE ROTOR BLADES

(75) Inventors: Scott Edmond Ellis, Easley, SC (US); Daniel Alan Hynum, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 979 days.

(21) Appl. No.: 12/894,967

(22) Filed: Sep. 30, 2010

(65) Prior Publication Data

US 2012/0082566 A1    Apr. 5, 2012

(51) Int. Cl.
*F01D 5/18*    (2006.01)

(52) U.S. Cl.
USPC ............ 416/97 R; 416/96 R; 416/193 A; 29/889.721; 29/525; 29/527.6

(58) Field of Classification Search
USPC ....... 415/115, 116; 416/95, 96 R, 96 A, 97 R, 416/193 A; 29/889.7, 889.71, 889.72, 29/889.721, 889.722, 402.01, 29/402.03–402.07, 464–469, 514, 525, 29/527.1, 527.5, 527.6; 409/131
See application file for complete search history.

(56) References Cited

U.S. PATENT DOCUMENTS

| | | |
|---|---|---|
| 3,950,114 A | 4/1976 | Helms |
| 4,712,979 A | 12/1987 | Finger |
| 4,798,514 A | 1/1989 | Pask |
| 5,340,278 A | 8/1994 | Magowan |
| 5,382,135 A | 1/1995 | Green |
| 5,813,835 A | 9/1998 | Corsmeier et al. |
| 6,017,819 A | 1/2000 | Brigham et al. |
| 6,019,579 A | 2/2000 | Fukuno et al. |
| 6,120,249 A | 9/2000 | Hultgren et al. |
| 6,190,130 B1 | 2/2001 | Fukue et al. |
| 6,196,799 B1 | 3/2001 | Fukue et al. |
| 6,402,417 B1 | 6/2002 | Okamoto |
| 6,431,833 B2 | 8/2002 | Jones |
| 6,478,540 B2 | 11/2002 | Abuaf et al. |
| 7,097,424 B2 | 8/2006 | Cunha et al. |
| 7,147,439 B2 | 12/2006 | Jacala et al. |
| 7,198,467 B2 | 4/2007 | Keith et al. |
| 7,347,664 B2 | 3/2008 | Kayser et al. |

(Continued)

FOREIGN PATENT DOCUMENTS

JP    2005-146858 A  * 6/2005 ............ F01D 5/18

*Primary Examiner* — Christopher Verdier
(74) *Attorney, Agent, or Firm* — Mark E. Henderson; Ernest G. Cusick; Frank A. Landgraff

(57) ABSTRACT

A platform cooling arrangement for a turbine rotor blade having a platform and an interior cooling passage and, in operation, a high-pressure coolant region and a low-pressure coolant region, wherein the platform includes a topside, which extends from the airfoil to a pressure side slashface, and an underside. The platform cooling arrangement may include: an airfoil manifold that resides near the junction of the pressure face of the airfoil and the platform; a slashface manifold that resides near the pressure side slashface; a high-pressure connector that connects the airfoil manifold to a high-pressure coolant region of the interior cooling passage; a low-pressure connector that connects the slashface manifold to a low-pressure coolant region of the interior cooling passage; cooling apertures that extend from a starting point along the pressure side slashface to a connection with the airfoil manifold, bisecting the slashface manifold therebetween; and a plurality of non-integral plugs.

29 Claims, 10 Drawing Sheets

(56) References Cited

U.S. PATENT DOCUMENTS

| | | |
|---|---|---|
| 7,416,391 B2 | 8/2008 | Veltre et al. |
| 2006/0056968 A1 | 3/2006 | Jacala et al. |
| 2006/0269409 A1* | 11/2006 | Torii et al. ............ 416/97 R |
| 2007/0177976 A1* | 8/2007 | Cunha et al. ............ 416/97 R |
| 2007/0189896 A1 | 8/2007 | Itzel et al. |
| 2009/0202339 A1* | 8/2009 | Torii et al. ............ 415/115 |
| 2010/0239432 A1* | 9/2010 | Liang ............ 416/97 R |
| 2010/0322767 A1* | 12/2010 | Nadvit et al. ............ 416/97 R |
| 2011/0223004 A1* | 9/2011 | Lacy et al. ............ 415/115 |

* cited by examiner

APPARATUS AND METHODS FOR COOLING PLATFORM REGIONS OF TURBINE ROTOR BLADES

BACKGROUND OF THE INVENTION

The present application relates generally to combustion turbine engines, which, as used herein and unless specifically stated otherwise, includes all types of combustion turbine engines, such as those used in power generation and aircraft engines. More specifically, but not by way of limitation, the present application relates to apparatus, systems and/or methods for cooling the platform region of turbine rotor blades.

A gas turbine engine typically includes a compressor, a combustor, and a turbine. The compressor and turbine generally include rows of airfoils or blades that are axially stacked in stages. Each stage typically includes a row of circumferentially spaced stator blades, which are fixed, and a set of circumferentially spaced rotor blades, which rotate about a central axis or shaft. In operation, the rotor blades in the compressor are rotated about the shaft to compress a flow of air. The compressed air is then used within the combustor to combust a supply of fuel. The resulting flow of hot gases from the combustion process is expanded through the turbine, which causes the rotor blades to rotate the shaft to which they are attached. In this manner, energy contained in the fuel is converted into the mechanical energy of the rotating shaft, which then, for example, may be used to rotate the coils of a generator to generate electricity.

Referring to FIGS. 1 and 2, turbine rotor blades 100 generally include an airfoil portion or airfoil 102 and a root portion or root 104. The airfoil 102 may be described as having a convex suction face 105 and a concave pressure face 106. The airfoil 102 further may be described as having a leading edge 107, which is the forward edge, and a trailing edge 108, which is the aft edge. The root 104 may be described as having structure (which, as shown, typically includes a dovetail 109) for affixing the blade 100 to the rotor shaft, a platform 110 from which the airfoil 102 extends, and a shank 112, which includes the structure between the dovetail 109 and the platform 110.

As illustrated, the platform 110 may be substantially planar. More specifically, the platform 110 may have a planar topside 113, which, as shown in FIG. 1, may include an axially and circumferentially extending flat surface. As shown in FIG. 2, the platform 110 may have a planar underside 114, which may also include an axially and circumferentially extending flat surface. The topside 113 and the bottom side 114 of the platform 110 may be formed such that each is substantially parallel to the other. As depicted, it will be appreciated that the platform 110 typically has a thin radial profile, i.e., there is a relatively short radial distance between the topside 113 and the bottom side 114 of the platform 110.

In general, the platform 110 is employed on turbine rotor blades 100 to form the inner flow path boundary of the hot gas path section of the gas turbine. The platform 110 further provides structural support for the airfoil 102. In operation, the rotational velocity of the turbine induces mechanical loading that creates highly stressed regions along the platform 110 that, when coupled with high temperatures, ultimately cause the formation of operational defects, such as oxidation, creep, low-cycle fatigue cracking, and others. These defects, of course, negatively impact the useful life of the rotor blade 100. It will be appreciated that these harsh operating conditions, i.e., exposure to extreme temperatures of the hot gas path and mechanical loading associated with the rotating blades, create considerable challenges in designing durable, long-lasting rotor blade platforms 110 that both perform well and are cost-effective to manufacture.

One common solution to make the platform region 110 more durable is to cool it with a flow of compressed air or other coolant during operation, and a variety of these type of platform designs are known. However, as one of ordinary skill in the art will appreciate, the platform region 110 presents certain design challenges that make it difficult to cool in this manner. In significant part, this is due to the awkward geometry of this region, in that, as described, the platform 110 is a periphery component that resides away from the central core of the rotor blade and typically is designed to have a structurally sound, but thin radial thickness.

To circulate coolant, rotor blades 100 typically include one or more hollow cooling passages 116 (see FIGS. 3, 4, 5, and 9) that, at minimum, extend radially through the core of the blade 100, including through the root 104 and the airfoil 102. As described in more detail below, to increase the exchange of heat, such cooling passages 116 may be formed having a serpentine path that winds through the central regions of the blade 100, though other configurations are possible. In operation, a coolant may enter the central cooling passages via one or more inlets 117 formed in the inboard portion of the root 104. The coolant may circulate through the blade 100 and exit through outlets (not shown) formed on the airfoil and/or via one or more outlets (not shown) formed in the root 104. The coolant may be pressurized, and, for example, may include pressurized air, pressurized air mixed with water, steam, and the like. In many cases, the coolant is compressed air that is diverted from the compressor of the engine, though other sources are possible. As discussed in more detail below, these cooling passages typically include a high-pressure coolant region and a low-pressure coolant region. The high-pressure coolant region typically corresponds to an upstream portion of the cooling passage that has a higher coolant pressure, whereas the low-pressure coolant region corresponds to a downstream portion having a relatively lower coolant pressure.

In some cases, the coolant may be directed from the cooling passages 116 into a cavity 119 formed between the shanks 112 and platforms 110 of adjacent rotor blades 100. From there, the coolant may be used to cool the platform region 110 of the blade, a conventional design of which is presented in FIG. 3. This type of design typically extracts air from one of the cooling passages 116 and uses the air to pressurize the cavity 119 formed between the shanks 112/platforms 110. Once pressurized, this cavity 119 then supplies coolant to cooling channels that extend through the platforms 110. After traversing the platform 110, the cooling air may exit the cavity through film cooling holes formed in the topside 113 of the platform 110.

It will be appreciated, however, that this type of conventional design has several disadvantages. First, the cooling circuit is not self-contained in one part, as the cooling circuit is only formed after two neighboring rotor blades 100 are assembled. This adds a great degree of difficulty and complexity to installation and pre-installation flow testing. A second disadvantage is that the integrity of the cavity 119 formed between adjacent rotor blades 100 is dependent on how well the perimeter of the cavity 119 is sealed. Inadequate sealing may result in inadequate platform cooling and/or wasted cooling air. A third disadvantage is the inherent risk that hot gas path gases may be ingested into the cavity 119 or the platform itself 110. This may occur if the cavity 119 is not maintained at a sufficiently high pressure during operation. If the pressure of the cavity 119 falls below the pressure within the hot gas path, hot gases will be ingested into the shank cavity 119 or the platform 110 itself, which typically damages these components as they were not designed to endure exposure to the hot gas-path conditions.

FIGS. 4 and 5 illustrate another type of conventional design for platform cooling. In this case, the cooling circuit is contained within the rotor blade 100 and does not involve the shank cavity 119, as depicted. Cooling air is extracted from one of the cooling passages 116 that extend through the core of the blade 110 and directed aft through cooling channels 120 formed within the platform 110 (i.e., "platform cooling channels 120"). As shown by the several arrows, the cooling air flows through the platform cooling channels 120 and exits through outlets in the aft edge 121 of the platform 110 or from outlets disposed along the suction side edge 122. (Note that in describing or referring to the edges or faces of the rectangular platform 110, each may be delineated based upon its location in relation to the suction face 105 and pressure face 106 of the airfoil 102 and/or the forward and aft directions of the engine once the blade 100 is installed. As such, as one of ordinary skill in the art will appreciate, the platform may include an aft edge 121, a suction side edge 122, a forward edge 124, and a pressure side edge 126, as indicated in FIGS. 3 and 4. In addition, the suction side edge 122 and the pressure side edge 126 also are commonly referred to as "slashfaces" and the narrow cavity formed therebetween once neighboring rotor blades 100 are installed may be referred to as a "slashface cavity".)

It will be appreciated that the conventional designs of FIGS. 4 and 5 have an advantage over the design of FIG. 3 in that they are not affected by variations in assembly or installation conditions. However, conventional designs of this nature have several limitations or drawbacks. First, as illustrated, only a single circuit is provided on each side of the airfoil 102 and, thus, there is the disadvantage of having limited control of the amount of cooling air used at different locations in the platform 110. Second, conventional designs of this type have a coverage area that is generally limited. While the serpentine path of FIG. 5 is an improvement in terms of coverage over FIG. 4, there are still dead areas within the platform 110 that remain uncooled. Third, to obtain better coverage with intricately formed platform cooling channels 120, manufacturing costs increase dramatically, particularly if the cooling channels have shapes that require a casting process to form. Fourth, these conventional designs typically dump coolant into the hot gas path after usage and before the coolant is completely exhausted, which negatively affects the efficiency of the engine. Fifth, conventional designs of this nature generally have little flexibility. That is, the channels 120 are formed as an integral part of the platform 110 and provide little or no opportunity to change their function or configuration as operating conditions vary. In addition, these types of conventional designs are difficult to repair or refurbish.

As a result, conventional platform cooling designs are lacking in one or more important areas. There remains a need for improved apparatus, systems, and methods that effectively and efficiently cool the platform region of turbine rotor blades, while also being cost-effective to construct, flexible in application, and durable.

BRIEF DESCRIPTION OF THE INVENTION

The present application thus describes a platform cooling arrangement for a turbine rotor blade having a platform at an interface between an airfoil and a root, wherein the rotor blade includes an interior cooling passage that extends from the root to at least the approximate radial height of the platform and comprises, in operation, a high-pressure coolant region and a low-pressure coolant region, and wherein, along the side of the platform that corresponds with a pressure face of the airfoil, the platform comprises a topside, which extends from the airfoil to a pressure side slashface, and an underside. The platform cooling arrangement may include an airfoil manifold that resides in the platform, near the junction of the pressure face of the airfoil and the platform; a slashface manifold that resides in the platform, near the pressure side slashface; a high-pressure connector that connects the airfoil manifold to the high-pressure coolant region of the interior cooling passage; a low-pressure connector that connects the slashface manifold to the low-pressure coolant region of the interior cooling passage; a plurality of cooling apertures, the cooling apertures comprising apertures that extend from a starting point along the pressure side slashface to a connection with the airfoil manifold, bisecting the slashface manifold therebetween; and a plurality of non-integral plugs that reside in at least one of the following: the cooling apertures, the high-pressure connector; and the low-pressure connector; wherein the configurations and locations of the plugs are configured such that a desired flow pattern of coolant through the platform is achieved.

The present application further describes a method of fabricating a platform cooling arrangement in the turbine rotor blade having a platform at an interface between an airfoil and a root, wherein the rotor blade includes an interior cooling passage that extends from the root to at least the approximate radial height of the platform and comprises, in operation, a high-pressure coolant region and a low-pressure coolant region, and wherein, along the side of the platform that corresponds with a pressure face of the airfoil, the platform comprises a topside, which extends from the airfoil to a pressure side slashface, and an underside. The method including the steps of: forming an airfoil manifold that resides in the platform, near the junction of the pressure face of the airfoil and the platform; forming a slashface manifold that resides in the platform, near the pressure side slashface; machining a high-pressure connector that extends linearly and in an approximate circumferential direction from the pressure side slashface to a junction with the high-pressure coolant region of the interior cooling passage, the linear path of the high-pressure connector being machined along a predetermined path such that the high-pressure connector bisects the slashface manifold and the airfoil manifold before connecting with the high-pressure coolant region of the interior cooling passage; machining a low-pressure connector that extends linearly in an approximate circumferential direction from the pressure side slashface to a junction with a low-pressure coolant region of the interior cooling passage, the linear path of the low-pressure connector being machined along a predetermined path such that it bisects the slashface manifold before connecting with the low-pressure coolant region of the interior cooling passage; machining a plurality of cooling apertures that extend in an approximate circumferential direction from the pressure side slashface to a junction with the airfoil manifold, the path of the cooling apertures being machined along a predetermined path such that each bisects the slashface manifold before connecting with the airfoil manifold; and installing a plurality of plugs within at least one of the cooling apertures, the high-pressure connector; and the low-pressure connector; wherein the configurations and locations of the plugs are configured such that a desired flow pattern of coolant through the platform is achieved.

The present application further describes a method of fabricating a platform cooling arrangement in the turbine rotor blade having a platform at an interface between an airfoil and a root, wherein the rotor blade includes an interior cooling passage that extends from the root to at least the approximate radial height of the platform and comprises, in operation, a high-pressure coolant region and a low-pressure coolant region, and wherein, along the side of the platform that corresponds with a pressure face of the airfoil, the platform comprises a planar topside, which extends from the airfoil to a pressure side slashface, and an underside. The method including the steps of: forming an airfoil manifold by machining a first channel in the underside of the platform and enclosing the first channel with a first manifold plate; forming a slashface manifold by machining a second channel in the underside of the platform and enclosing the second channel with a second manifold plate; machining a high-pressure connector that extends linearly and in an approximate circumferential direction from the suction side slashface to a junction with the airfoil manifold, the linear path of the high-pressure connector being machined along a predetermined path such that the high-pressure connector bisects the high-pressure coolant region of the interior cooling passage before connecting with the airfoil manifold; machining a low-pressure connector that extends linearly in a approximate circumferential direction from the pressure side slashface to a junction with a low-pressure coolant region of the interior cooling passage, the linear path of the low-pressure connector being machined along a predetermined path such that it bisects the slashface manifold before connecting with the low-pressure coolant region of the interior cooling passage; machining a plurality of cooling apertures that extend in an approximate circumferential direction from the pressure side slashface to a junction with the airfoil manifold, the path of the cooling apertures being machined along a predetermined path such that each bisects the slashface manifold before connecting with the airfoil manifold; and installing a plurality of plugs within at least one of the cooling apertures, the high-pressure connector, and the low-pressure connector; wherein the configurations and locations of the plugs are configured such that a desired flow pattern of coolant through the platform is achieved.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
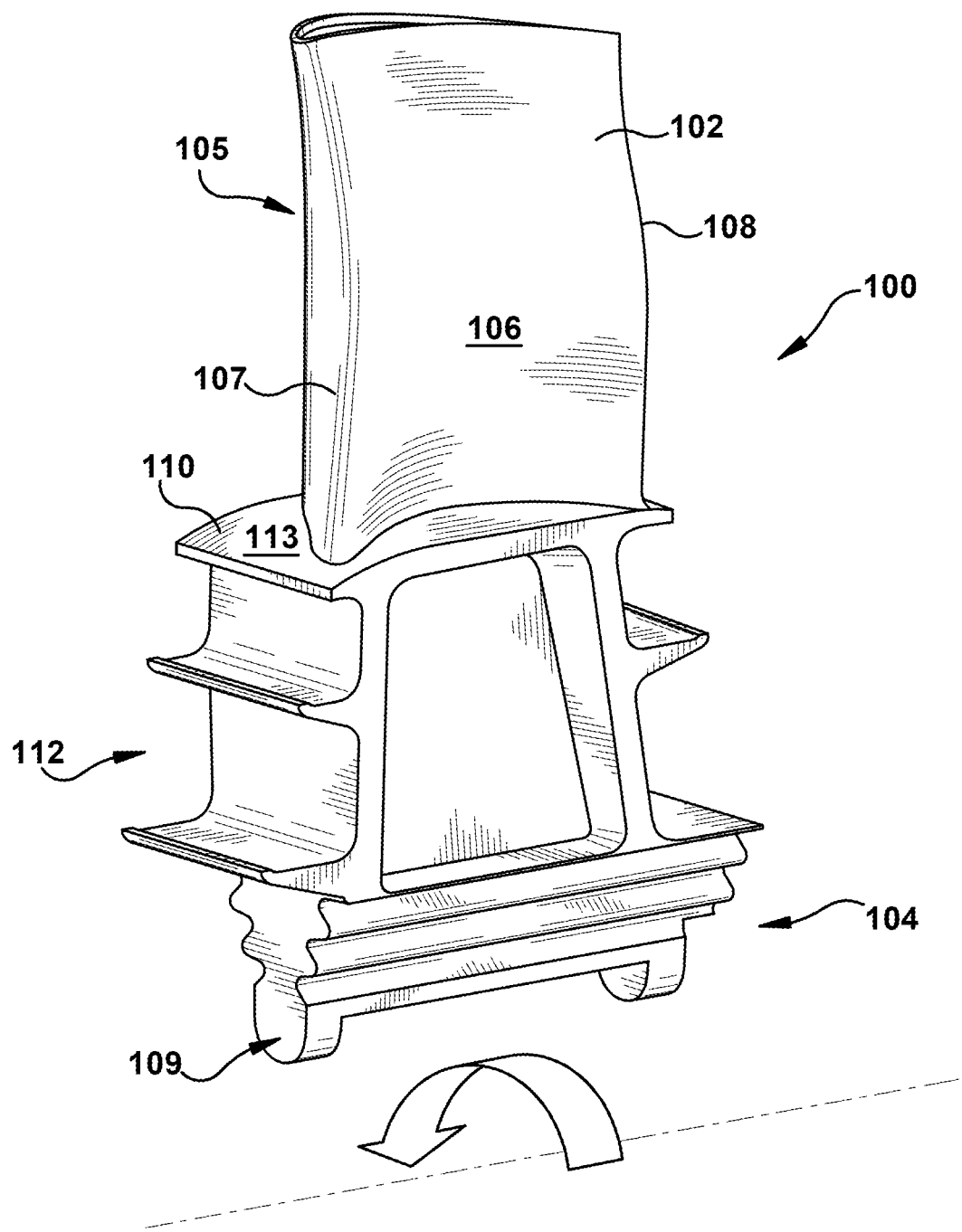
FIG. 1 illustrates a perspective view of an exemplary turbine rotor blade in which embodiments of the present invention may be employed.
Figure 2:
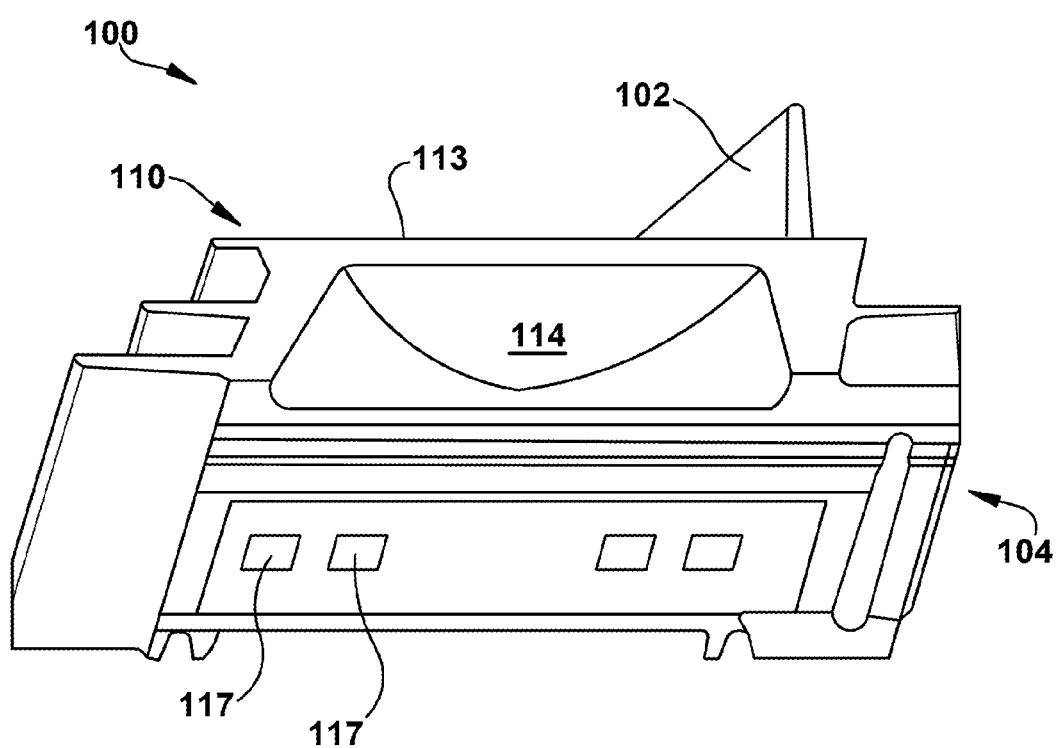
FIG. 2 illustrates an underside view of a turbine rotor blade in which embodiments of the present invention may be used.
Figure 3:
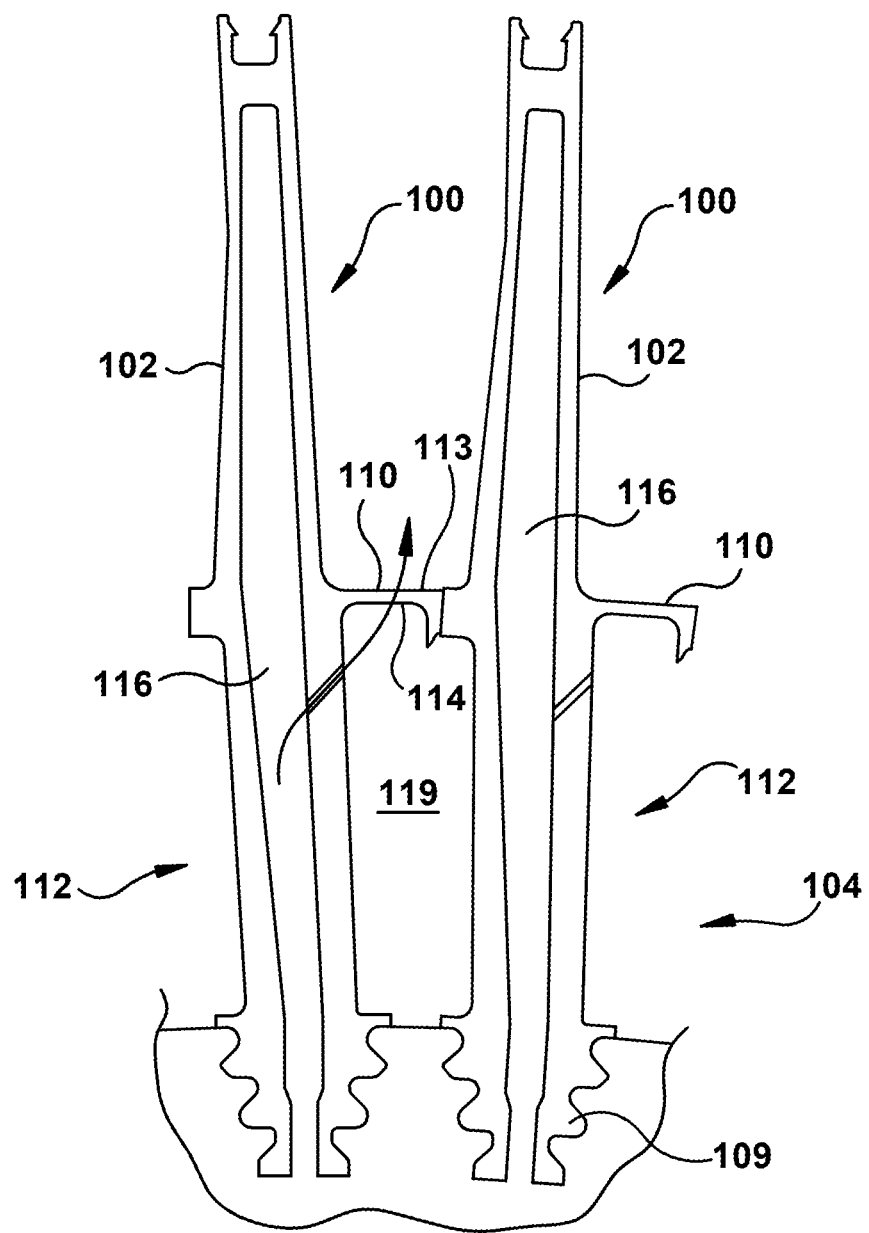
FIG. 3 illustrates a sectional view of neighboring turbine rotor blades having a cooling system according to conventional design.
Figure 4:
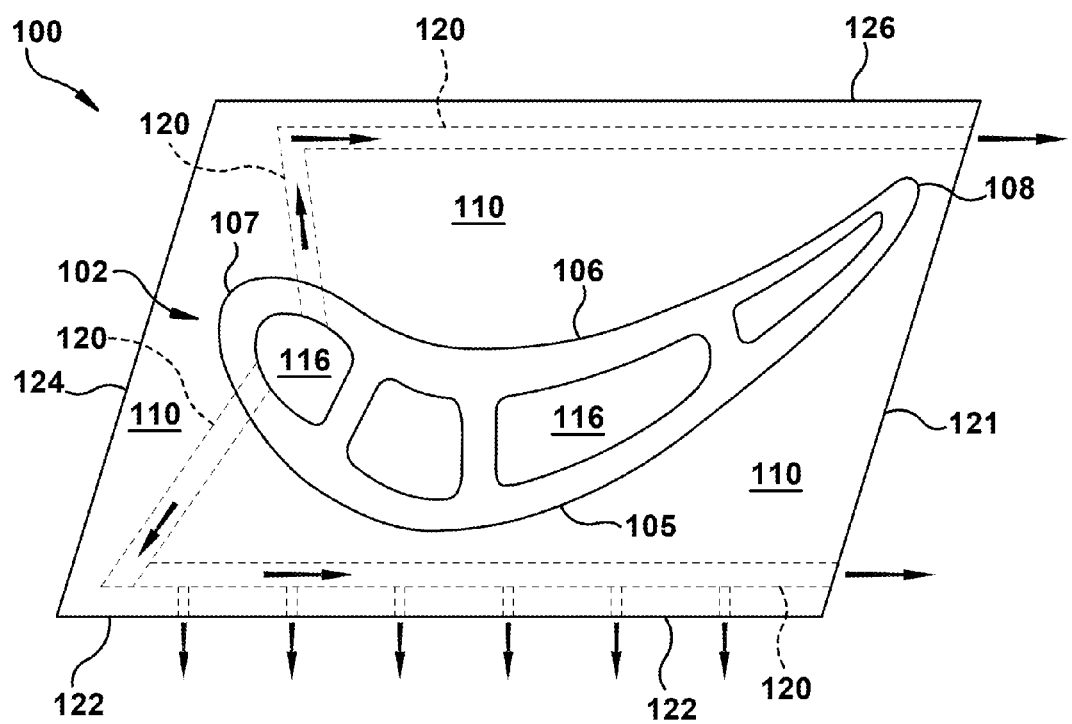
FIG. 4 illustrates a top view of a turbine rotor blade having a platform with interior cooling channels according to conventional design.
Figure 5:
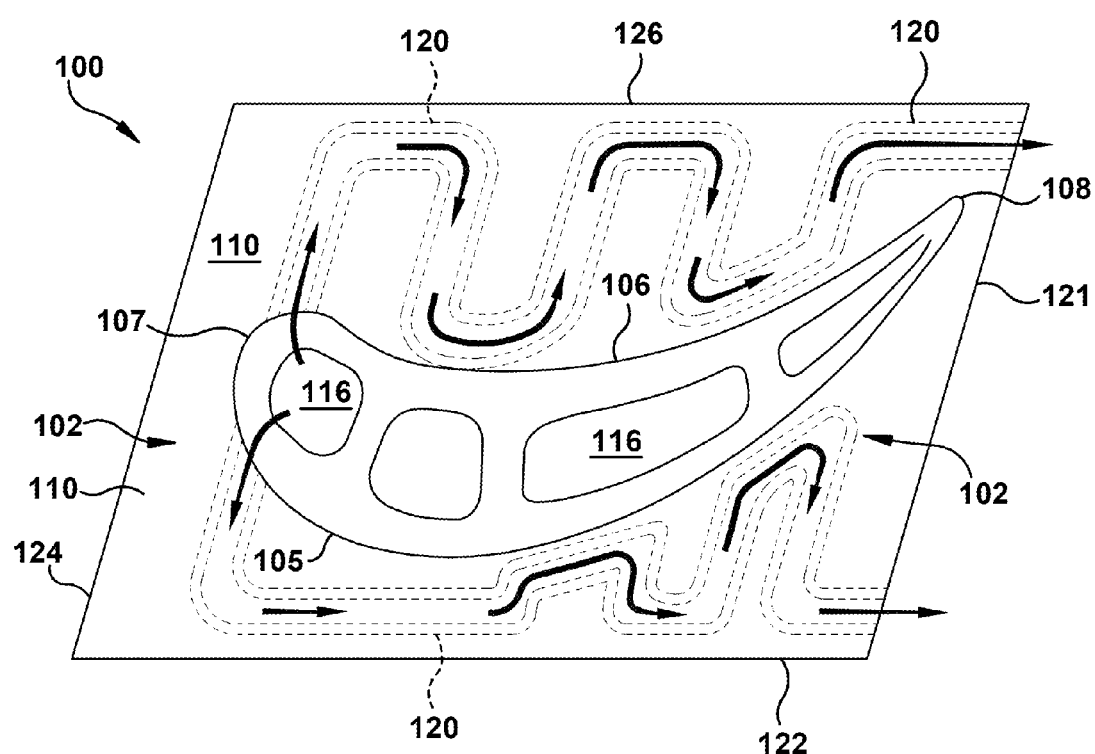
FIG. 5 illustrates a top view of a turbine rotor blade having a platform with interior cooling channels according to an alternative conventional design.
Figure 6:
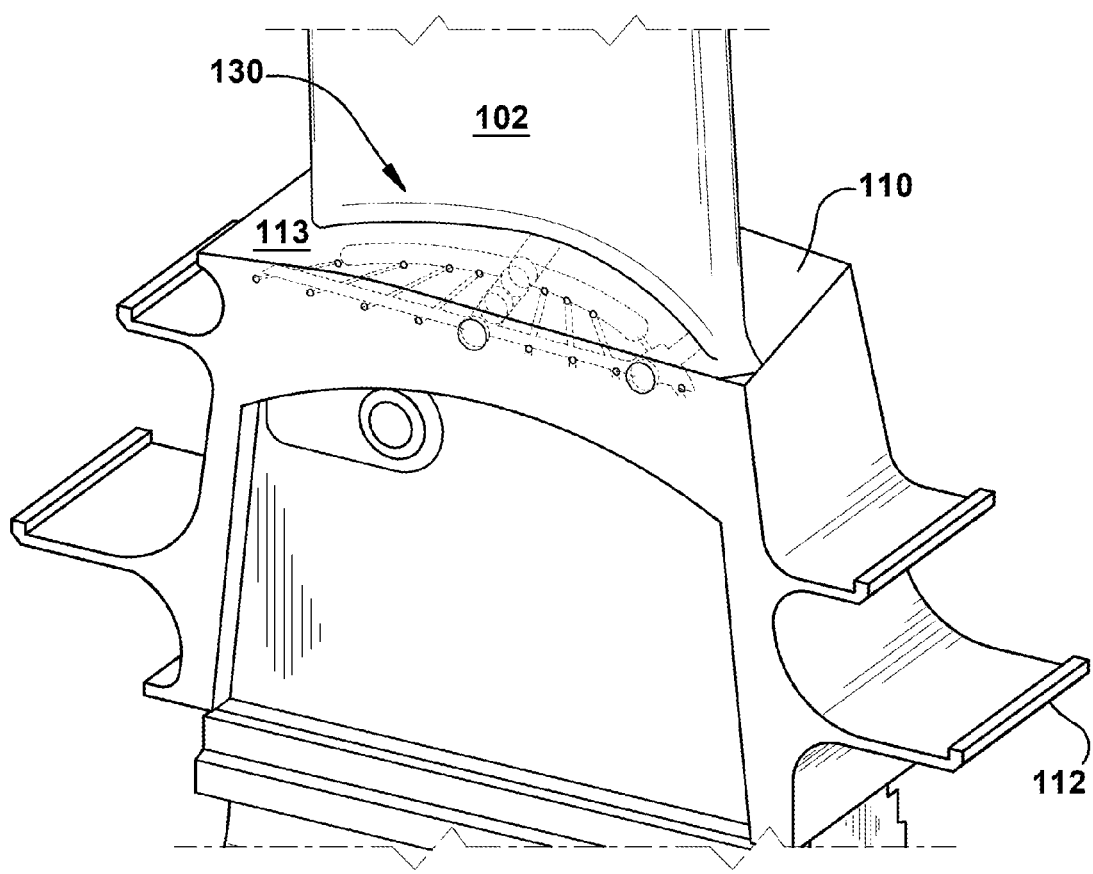
FIG. 6 illustrates a perspective view of a turbine rotor blade having a platform cooling arrangement according to an exemplary embodiment of the present invention.
Figure 8:
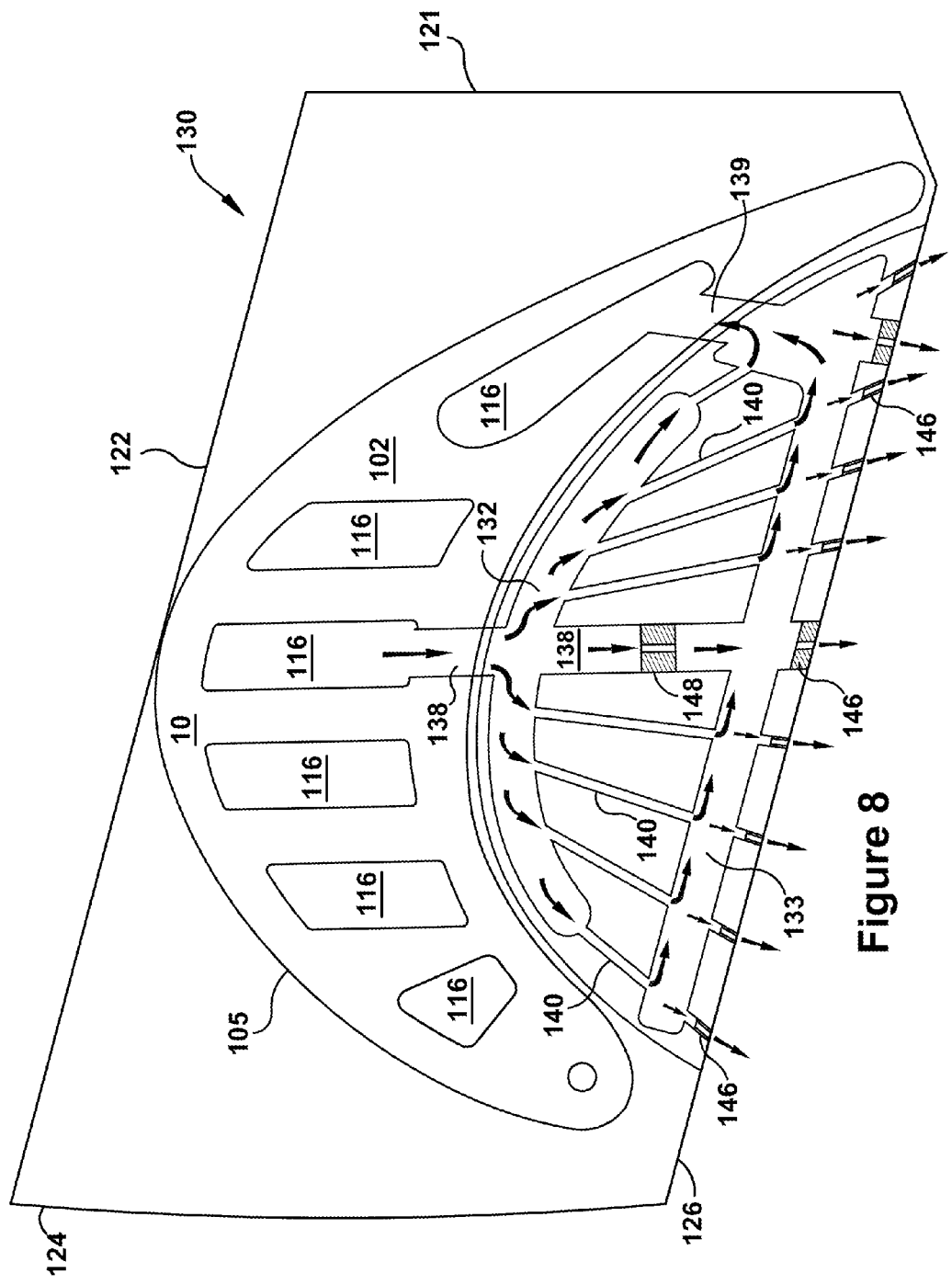
FIG. 8 illustrates a top with partial cross-sectional view of the turbine rotor blade having a platform cooling arrangement according to an alternative embodiment of the present invention.
Figure 9:
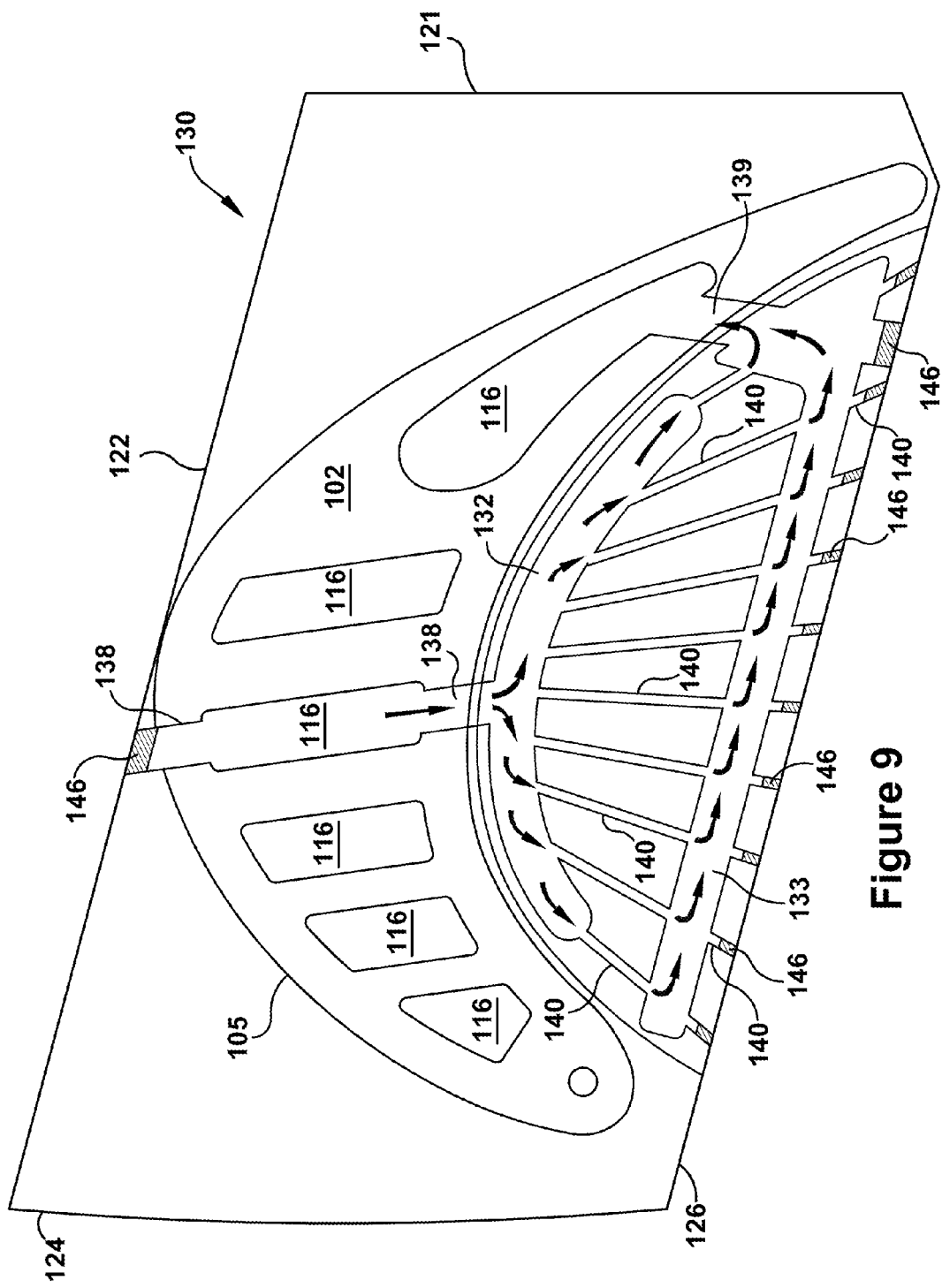
FIG. 9 illustrates a top with partial cross-sectional view of the turbine rotor blade having a platform cooling arrangement according to an alternative embodiment of the present invention.

It will be appreciated that turbine blades that are cooled via the internal circulation of a coolant typically include an interior cooling passage 116 that extends radially outward from the root, through the platform region, and into the airfoil, as described above in relation to several conventional cooling designs. It will be appreciated that certain embodiments of the present invention may be used in conjunction with conventional coolant passages to enhance or enable efficient active platform cooling, and the present invention is discussed in connection with a common design: an interior cooling passage 116 having a winding or serpentine configuration. As depicted in FIGS. 6, 8, and 9, the serpentine path is typically configured to allow a one-way flow of coolant and includes features that promote the exchange of heat between the coolant and the surrounding rotor blade 100. In operation, a pressurized coolant, which typically is compressed air bled from the compressor (though other types of coolant, such as steam, also may be used with embodiments of the present invention), is supplied to the interior cooling passage 116 through a connection formed through the root 104. The pressure drives the coolant through the interior cooling passage 116, and the coolant convects heat from the surrounding walls.

As the coolant moves through the cooling passage 116, it will be appreciated that it loses pressure, with the coolant in the upstream portions of the interior cooling passage 116 having a higher pressure than coolant in downstream portions. As discussed in more detail below, this pressure differential may be used to drive coolant across or through cooling passages formed in the platform. It will be appreciated that the present invention may be used in rotor blades 100 having internal cooling passages of different configurations and is not limited to interior cooling passages having a serpentine form. Accordingly, as used herein, the term "interior cooling passage" or "cooling passage" is meant to include any passage or hollow channel through which coolant may be circulated in the rotor blade. As provided herein, the interior cooling passage 116 of the present invention extends to at least to the approximate radial height of the platform 116, and may include at least one region of relatively higher coolant pressure (which, hereinafter, is referred to as a "region of high pressure" and, in some cases, may be an upstream section within a serpentine passage) and at least one region of relatively lower coolant pressure (which, hereinafter, is referred to as a "region of low pressure" and, relative to the region of high pressure, may be a downstream section within a serpentine passage).

In general, the various designs of conventional internal cooling passages 116 are effective at providing active cooling to certain regions within the rotor blade 100. However, as one of ordinary skill in the art will appreciate, the platform region proves more challenging. This is due, at least in part, to the platform's awkward geometry—i.e., its narrow radial height and the manner in which it juts away from the core or main body of the rotor blade 100. However, given its exposures to the extreme temperatures of hot gas path and high mechanical loading, the cooling requirements of the platform are considerable. As described above, conventional platform cooling designs are ineffective because they fail to address the particular challenges of the region, are inefficient with their usage of coolant, and/or are costly to fabricate.

Figure 7:
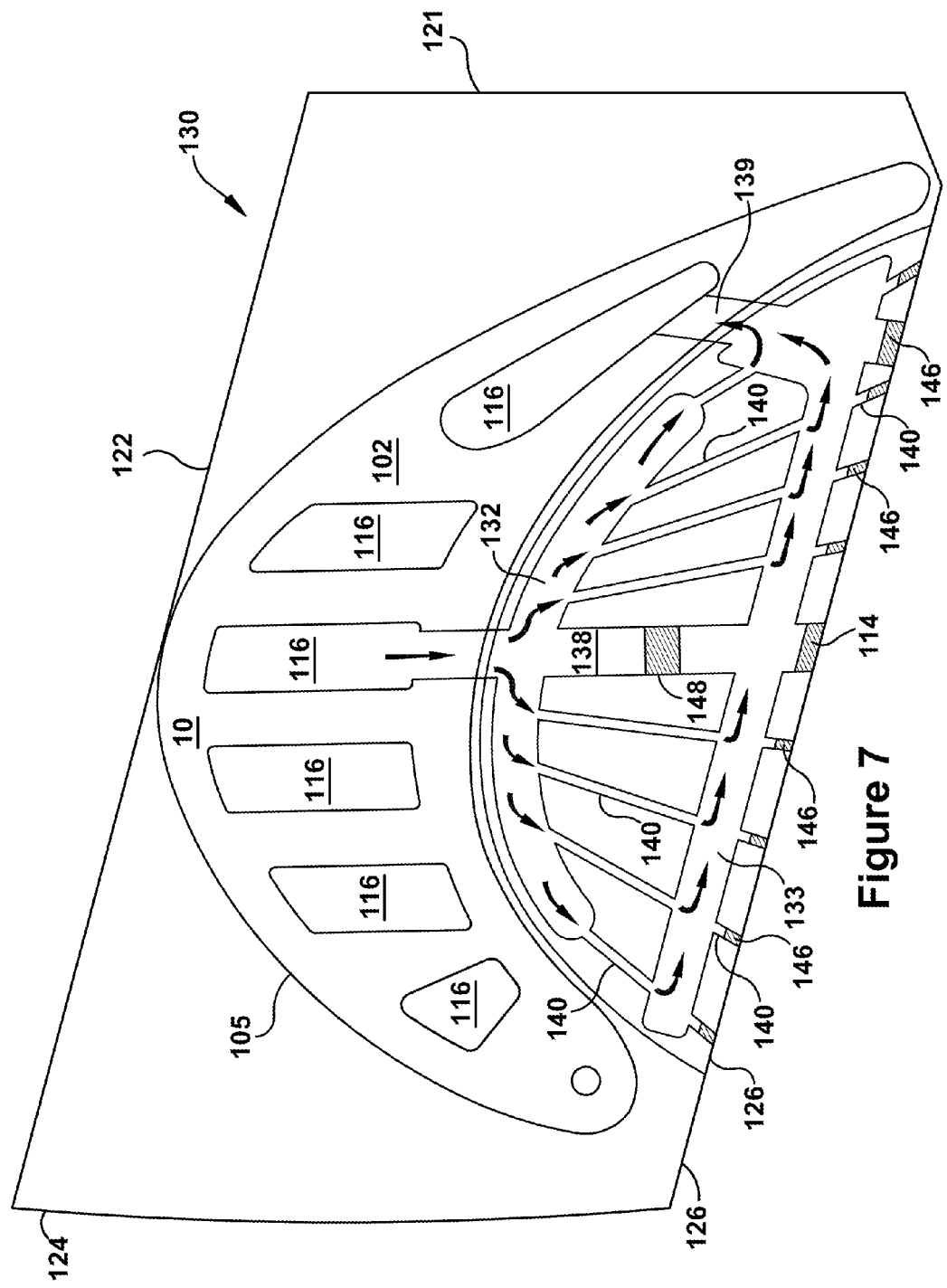
FIG. 7 illustrates a top with partial cross-sectional view of a turbine rotor blade having a platform cooling arrangement according to an exemplary embodiment of the present invention.

Referring again to the figures, several views of exemplary embodiments of the present invention are provided. FIGS. 6 through 10, in particular, illustrate turbine rotor blades 100 having a platform cooling configuration 130 according to preferred embodiments. As shown, the blade 100 includes a platform 110 residing at the interface between an airfoil 102 and a root 104. As shown in FIG. 7, the rotor blade 100 includes an interior cooling passage 116 that extends radially from a connection with a coolant source at the root 104. At the side of the platform 110 that corresponds with a pressure face 106 of the airfoil 102, it will be appreciated that the platform 110 may have a planar topside 113, which extends from the airfoil 102 to a pressure side slashface 126, and a planar underside 114. (Note that "planar," as used herein, means approximately or substantially in the shape of a plane. For example, one of ordinary skill in the art will appreciate that platforms may be configured to have an outboard surface that is slight curved and convex, with the curvature corresponding to the circumference of the turbine at the radial location of the rotor blades. As used herein, this type of platform shape is deemed planar, as the radius of curvature is sufficiently great to give the platform a flat appearance.) Configured within the interior of the platform 110, the platform cooling configuration 130 may include: an airfoil manifold 132; a slashface manifold 133; a pair of connectors 138, 139 that, with the manifolds 132, 133, form a circuit between a high-pressure and low-pressure coolant region of the interior cooling passage 116; and a plurality of cooling apertures 140 that connect the two manifolds 132, 133 and provide coverage to the platform 110 so that coolant may be circulated therethrough.

More particularly, the present invention includes a series of convective passages formed within the pressure side of the platform and a method by which these convective passages may be fabricated. The invention proposes the creation of two underside platform channels or underside channels 134 that extend across the underside 114 of the platform 110, generally in an axial direction. Each of the underside channels 134 may be enclosed via a manifold plate 135, and, together, the underside channel 134 and the manifold plate 135 may form two separate manifolds. The manifolds 132, 133 are referred herein based on their proximity to either the airfoil 102 or the pressure-side slashface 126. Accordingly, the airfoil manifold 132 may reside in proximity to the airfoil 102 (i.e., where the airfoil 102 connects to the platform 110.) In some embodiments, the airflow manifold 132 may have an arch-like shape and may be located close and in spaced relation to the pressure face 106 of the airfoil 102. Other configurations are possible. The arch-like shape of the airfoil manifold 132 may correspond to the contour of the profile of the pressure face 106 of the airfoil 102 (i.e., the shape of the airfoil adds viewed from the perspective of FIGS. 7, 8 and nine). Whereas, the slashface manifold 133 may reside in proximity to the pressure side slashface 126. The slashface manifold 133 may be linear in shape and offset slightly from the pressure side slashface 126, as illustrated. In some embodiments, the slashface manifold 133 extends axially from an axial position near the trailing edge 108 of the airfoil 102 to an axial position near the leading edge 107 of the airfoil 102.

Figure 10:
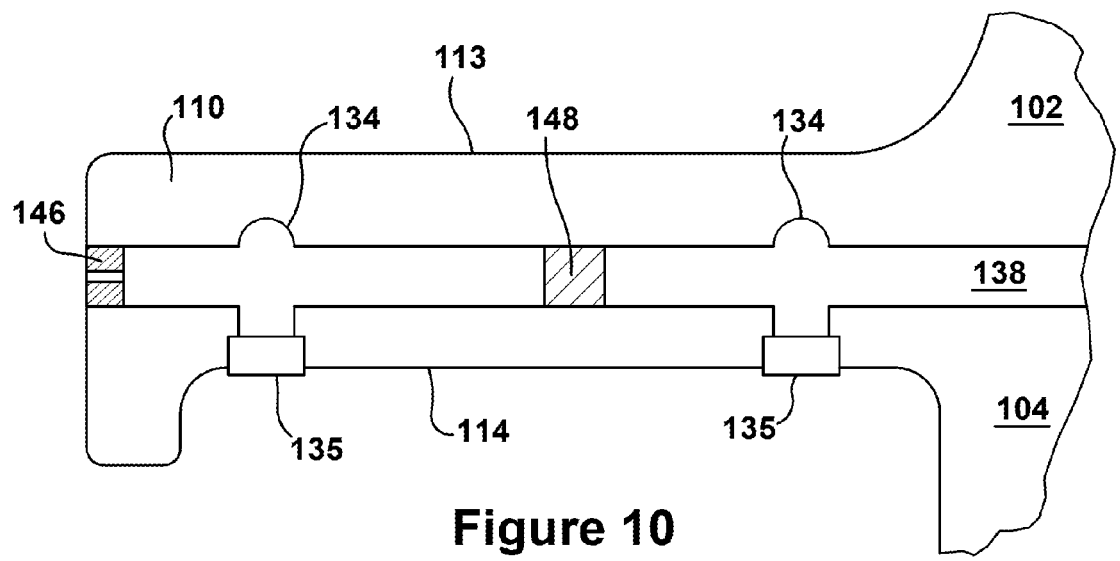
FIG. 10 illustrates a cross-sectional side view of the turbine rotor blade having a platform cooling arrangement according to an exemplary embodiment of the present invention.
Figure 11:
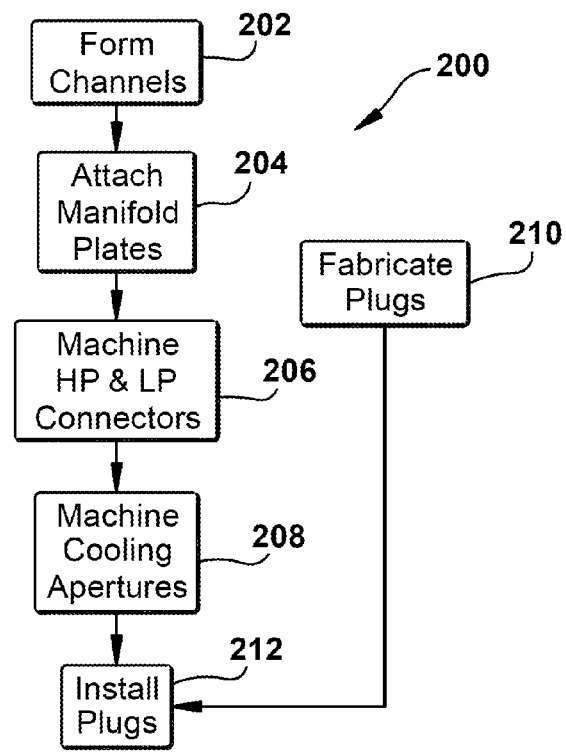
FIG. 11 illustrates an exemplary method of creating a platform cooling arrangement according to an exemplary embodiment of the present application.

It will be appreciated that, according to an embodiment of the present invention, the manifolds 132, 133 may be formed via post-cast machining processes, as illustrated most clearly in FIG. 10. For example, after casting of the platform 110/rotor blade 100 is complete, the underside channels 134 may be plunge machined or bored into the underside 114 of a platform 110. (Alternatively, in other embodiments, the underside channels 134 used to form the manifolds 132, 133 may be created via a simple/conventional casting process.) The channels 134 then may be enclosed via a conventional joining operation (brazing, welding) that securely attaches a manifold plate 135 to the platform underside 114 such that the plate 135 stretches over the channels 134 and, thereby, encloses each. Once enclosed, as discussed in more detail below, the manifolds 132, 133 open only to the internal passages and apertures that connect to them. It will be appreciated that the manifold plates 135, once attached, serve as the underside of the platform 110 for the areas corresponding to the formed underside channels 134.

As illustrated, two plenums or connectors, a high-pressure connector 138 and a low-pressure connector 139, may be provided to connect the cooling passage 116 to the airfoil manifold 132 and the slashface manifold 133 in a desired manner. (It will be appreciated that, as follows, the description of the exemplary platform cooling configurations assumes that the upstream portions of the cooling passage 116 reside toward the leading edge 107 of the turbine blade 100, and that the downstream portion of the cooling passage 116 reside toward the trailing edge 108 of the turbine blade 100. This configuration is exemplary only, as it is not necessary for the practice of the current invention.) The airfoil manifold 132 connects via the high-pressure connector 138 to an upstream portion of the interior cooling passage 116, whereas the slashface manifold 133 connects via the low-pressure connector 139 to a downstream portion of the cooling passage 116.

In one embodiment, the high-pressure connector 138 extends linearly from the pressure side slashface 126 to a junction with a high-pressure coolant region of the interior cooling passage 116. The linear path may be configured such that the high-pressure connector 138 bisects the slashface manifold 133 and the airfoil manifold 132 before connecting to the high-pressure coolant region of the interior cooling passage 116. It will be appreciated that, configured in this manner, the high-pressure connector 138 may be cost-effectively formed using conventional, line of sight boring or machining processes. Similarly, the low-pressure connector 139 may extend linearly from the pressure side slashface to a junction with a low-pressure coolant region of the interior cooling passage 116. The linear path of the low-pressure connector 139 may be configured such that the low-pressure connector bisects the slashface manifold 133 before connecting to the low-pressure coolant region of the interior cooling passage 116. It will be appreciated that, like the high-pressure connector 138, the low-pressure connector 139 may be cost-effectively formed using conventional, line of sight boring or machining processes.

A plurality of cooling apertures 140 may also be formed from points along the pressure side slashface 126. This may be done via a similar line of sight boring or machining process as described above. From a starting position on the pressure side slashface 126, the cooling apertures 140 may extend in an approximate circumferential direction such that each bisects the slashface manifold 133 and then forms a junction with the airfoil manifold 132. The number and location of the cooling apertures 140 may vary depending on the configuration of the platform, thermal load, desired coverage, etc. In a preferred embodiment, as illustrated, the high-pressure connector 138 may be configured such that it has an axial position that coincides with the approximate axial midpoint of the pressure side slashface 126. In this case, at least a plurality of the cooling apertures 140 may be formed forward of the high-pressure connector 138 and at least a plurality of cooling apertures 140 may be formed aft of the high-pressure connector 138. The cooling apertures 140 may be spaced evenly across the pressure side slashface 126. In one preferred embodiment, at least four of the cooling apertures 140 are formed forward of the high-pressure connector 138 and at least four cooling apertures 140 are formed aft of the high-pressure connector 138. The cooling apertures 140 may have similar cross-sectional flow areas. In some embodiments, the cooling apertures 140 may have varying cross-sectional flow areas that are configured to meter the flow of coolant. In this manner, a desired flow pattern through the platform passages may be achieved.

Plugs also may be used to control the flow through the platform cooling configuration 130 such that a desired flow pattern is achieved. The plugs may include plugs that reside along the slashfaces 122, 126 of the platform 110 ("slashface plugs 146), and plugs that reside in the interior of the platform 110 ("mid-channel plugs 148"). Plugs 146, 148 may be formed such that they substantially block all flow through the passage in which it is located, thereby directing flow through an alternative, more desired route. It will be appreciated that, in this manner, plugs 146, 148 may be used to meter or direct flow such that desired flow patterns through the various platform cooling passages are achieved. For example, referring to the exemplary embodiment of FIG. 7, in order for the airfoil manifold 132 to adequately distribute coolant across the several cooling apertures 140, it may be required to block substantially all coolant flow therethrough. FIG. 7 reflects this configuration, as the high-pressure connector 138 contains a mid-channel plug 148 that completely blocks the cooling passage (which will be referred to herein as a "full plug"). As shown, the mid-channel plug 148 may be located between the airfoil manifold 132 and the slashface manifold 133. It will be appreciated that, given the relative size of the high-pressure connector 138 and the cooling apertures 140, if the high-pressure connector 138 were not blocked, an inordinate amount of coolant would flow through it from the airfoil manifold 132 to the slashface manifold 133, and the supply of coolant available to the cooling apertures 140 (that also connect the airfoil manifold 132 and the slashface manifold 133) might be somewhat limited. Thus, the high-pressure connector 138 may be completely plugged such that the redirecting a flow corresponds to a desired metering characteristic. As used herein, a "desired metering characteristic" refers to a desired distribution of coolant (or expected distribution of coolant) through the platform cooling passages and the several platform outlets that may be formed on the platform slashfaces 122, 126.

Alternatively, the plugs 146, 148 may be formed such that, upon installation, they reduce the cross-sectional flow area through the cooling passage in which it resides. In this case, the plug 146, 148 is configured to allow a desired level of flow through the passage and directs the remainder through alternative routes as desired. Herein, these plugs will be referred to as "partial plugs." It will be appreciated that the partial reduction of cross-sectional flow area through platform cooling passages may be done for at least two reasons. First, the cross-sectional area may be reduced to impinge coolant flowing through a particular cooling passage. This, as one of ordinary skill in the art will appreciate, may result in the coolant having desired coolant impingement characteristics, such as increasing the velocity at which a stream of coolant strikes a target surface. In general, it will be appreciated that, if the impinged flow is directed against a target surface, the cooling effect of the resulting high velocity stream of coolant is improved.

Second, in much the same way as described above in relation to plugs 146, 148 that completely block the cooling passages, the cross-sectional flow area of the passageway may be reduced such that metering or a desired distribution of coolant is achieved through the platform 110. For example, referring to the exemplary embodiment of FIG. 8, in order for the airfoil manifold 132 to distribute coolant across the several cooling apertures 140, it may be required to reduce the cross-sectional area of the high-pressure connector 138 (which, as stated, in preferred embodiments is generally larger than that of the cooling apertures 140). FIG. 8 reflects this configuration, as the mid-channel plug 148 includes a channel formed through its center. It will be appreciated that if the high-pressure connector 138 were not reduced in flow area, it is likely that an inordinate amount of coolant would flow through the high-pressure connector 138 from the airfoil manifold 132 to the slashface manifold 133, and the supply of coolant available to the cooling apertures 140 that also connect the airfoil manifold 132 and the slashface manifold 133 might be limited. Thus, the high-pressure connector 138 may be plugged such that the resulting flow area (i.e., the flow area of the channel formed through the mid-channel plug 148) corresponds to a desired metering characteristic. As stated, a "desired metering characteristic" refers to a desired distribution of coolant through the platform cooling passages and the several platform outlets. Though other designs are possible, the plug 146, 148 may have a "doughnut" shape, with the channel formed near the center of the plug 146, 148 corresponding to a desired cross-sectional flow area. The plug 146, 148 may be made of conventional materials and installed using conventional methods (i.e., welding, brazing, etc.). In the case of a slashface plug 146, once installed, the outer face of the plug 146 may reside flush in relation to the surface of the slashface 122, 126.

Referring to FIG. 7 again, several flow arrows are provided that reflect an exemplary flow pattern that might result if plugs 146, 148 are employed that block the entire cross-sectional flow area of the cooling passage in which they are located. Accordingly, coolant may flow from the interior cooling passage 116 to the airfoil manifold 132 via the high-pressure connector 138. From there, coolant may be fed into multiple cooling apertures 140, traverse the cooling apertures 140, and enter in the slashface manifold 133. From the slashface manifold 133, the coolant may travel via the low-pressure connector 139 and reenter the interior cooling passage 116. As shown, coolant is blocked from traveling through the high-pressure connector 138 via mid-channel plug 140, directing coolant instead to the cooling apertures 140. Also, no coolant is emitted through the several slashface plugs 146.

Alternatively, now referring to FIG. 8, several flow arrows are provided that reflect an exemplary flow pattern that might result if plugs 146, 148 are employed that partially block the cross-sectional flow area of the cooling passage in which they are located. Accordingly, coolant may flow from the interior cooling passage 116 to the airfoil manifold 132 via the high-pressure connector 138. From there, most of the coolant may be fed into multiple cooling apertures 140, traverse the cooling apertures 140, and enter in the slashface manifold 133. The remaining amount may flow through the channel formed within the mid-channel plug 148 that resides in the high-pressure connector 138 and, then, into the slashface manifold 133. From the slashface manifold 133, some of the coolant may travel via the low-pressure connector 139 and reenter the interior cooling passage 116, while the remainder is expelled through openings or channels formed through the slashface plugs 146 that are positioned along the pressure side slashface 126. The slashface plugs 146 may be configured to impinge this flow of exiting coolant such that, in operation, it cools the slashface of the neighboring blade. It will be appreciated that full plugs 146, 148 and partial plugs 146, 148 may be used within the same embodiment as necessary.

As illustrated in FIG. 9, in an alternative embodiment, the high-pressure connector 138 may be formed from the suction side slashface 122 such that it extends linearly from the suction side slashface 122 to a junction with the airfoil manifold 132. In this case, the linear path of the high-pressure connector 138 may be predetermined such that the high-pressure connector 138 bisects the high-pressure coolant region of the interior cooling passage 116 before connecting with the airfoil manifold 132. Depending on the application, the outlet formed on the suction side slashface 122 may be plugged completely, as shown, or partially. It will be appreciated that, in this case, the high-pressure connector 138 may be configured such that it does not extend through to the slashface manifold 133, instead terminating at the airfoil manifold 132. In its place, as shown in FIG. 9, it will be appreciated that by not extending the high-pressure connector 138 between the airfoil manifold 132 and the slashface manifold 133, more cooling apertures 140 may be provided.

It will be appreciated that designs according to the present invention may be implemented/tuned such that enhanced or optimized flow patterns may be realized. More particularly, the plugs 146, 148 may be modified such that flow patterns are altered to address changing or unanticipated thermal loads to the platform 110. Because the present invention may be implemented via post-cast processes, other aspects, such as enlarging the cross-sectional flow area of the cooling apertures 140, may be conveniently tailored to meet other desired criteria.

In one exemplary mode of operation, a coolant may enter the interior cooling passage 116 at a position near the leading edge 107 of the airfoil 102 and alternately flow radially outward/inward through the cooling passage 116 as the coolant meanders in an aftwise direction. The high-pressure connector 138 may be configured such that an upstream (and higher pressure) portion of the cooling passage 116 is connected to the nearby airfoil manifold 132. From the airfoil manifold 132, the coolant may then be fed through a plurality of cooling apertures 140 to the slashface manifold 133. The low-pressure connector 139 then provides an outlet for the coolant that collects within the slashface manifold 133 and a return to a downstream (and lower pressure) portion of the cooling passage 116. In some exemplary embodiments, the low-pressure connector 139 returns substantially all of the coolant taken from the interior cooling passage 116 by the high-pressure connector 138. This allows all of the coolant to be used in further cooling other areas of the turbine blade 100 or in other downstream applications. In other exemplary embodiments, a portion of the coolant is expended through the openings created along the pressure side slashface 126 by the cooling apertures 140, the high-pressure connector 138, and/or the low-pressure connector 139, while the remainder returns via the low-pressure connector 139 to the interior cooling passage 116 for further use.

It will be appreciated that the cooling apertures 140 may be formed via a machining process from the pressure side slashface 126. As previously described, the cooling apertures 140 may be machined along a predetermined path such that each intersects the two manifolds 132, 133. As such, the cooling apertures 140 may extend from the pressure side slashface 126 to a junction with the slashface manifold 133, and then continue from the opposite side of slashface manifold 133 to the connection it makes with the airfoil manifold 132. The cooling apertures 140 are shown as linear. Alternatively, the cooling apertures may be curved. Having a curved path may improve the coverage of the cooling apertures 140. However, a linear path may be more cost effective to form in that a conventional line of sight machining/boring process may be used. Machining methods may also be used to machine curved cooling apertures 140. Further, it will be appreciate that in certain preferred embodiments, the airfoil manifold 132 is formed to include an arch-like shaped profile that approximately corresponds to the profile contour of the pressure face of the airfoil, and that the slashface manifold is formed to include an approximate linear shape. In certain other preferred embodiments, the airfoil manifold resides just outboard of the underside of the platform and has a longitudinal axis that is approximately parallel to the planar topside of the platform. Likewise, in certain embodiments, the slashface manifold resides just outboard of the underside of the platform and has a longitudinal axis that is approximately parallel to the planar topside of the platform.

The present invention further includes a novel method of forming interior cooling channels within the platform region of a rotor blade according to the descriptions above in a cost-effective and efficient manner. Referring to flow diagram 200 of FIG. 10, as an initial step 202, the underside channels 134 may be formed in on the underside of the pressure side of the platform 110. The channels 134 may be efficiently formed via conventional machining processes. In an alternative embodiment, it will be appreciated that, because of the relatively uncomplicated shape of the channels 134, they may be cost-effectively formed using conventional casting processes. Whichever the case, expensive casting processes that must be used to form more intricate designs may be avoided.

Once the channels 134 are formed, at step 204, manifold plates 135 may be used to enclose each channel 134. This may be done by attaching manifold plates 135 via a conventional joining operation (brazing, welding) that secures each to the platform underside 114. Alternatively, a single plate covering both channels may be used.

At a step 206, the high-pressure connector 138 and the low-pressure connector 139 may be machined. The high-pressure connector 138 and the low-pressure connector 139 may be machined via a conventional, line of sight drilling process, as described. The high-pressure connector 138 may extend from either slashface 122, 126 and be configured to connect a high-pressure coolant region of the interior cooling passage 116 to the airfoil manifold 132. The low-pressure connector 139 may extend from the pressure side slashface 126 and be configured to connect the slashface manifold 133 to a low-pressure coolant region within the interior cooling passage 116.

At a step 208, the cooling apertures 140 may be machined. The cooling apertures 140 may be machined via a conventional, line of sight drilling process. As described, the cooling apertures 140 may extend from the pressure side slashface 126 and be configured to connect the airfoil manifold 132 to the slashface manifold 133.

Separately, as necessary, plugs 146, 148 may be fabricated at a step 210. As discussed above, the plugs 146, 148 may have several different configurations and be configured such that, upon installation, they reduce or block completely the cross-sectional flow area of an outlet or a platform cooling passage, whatever the case may be. The plugs 146, 148 may be fabricated using conventional methods and materials. Plugs may be used in any of the passages, including the cooling apertures 140.

Finally, at a step 212, the plugs 146, 148 may be installed. This may be done using conventional methods, such as welding, brazing, or mechanical attachment.

In operation, the present invention provides a mechanism to actively cool the platform region of a combustion turbine rotor blade by efficiently forming a complex and effective cooling arrangement using cost-effective, conventional techniques. As stated, this region is typically difficult to cool and, given the mechanical loads it must endure, represents a highly stressed region, particularly as firing temperatures increase. Accordingly, this type of active platform cooling is a significant enabling technology as higher firing temperatures, increased output, and greater efficiency are sought. Further, it will be appreciated that the usage of post-cast processes in the formation of the platform cooling channels provides greater flexibility to redesign, reconfigure, or retrofit platform cooling arrangements. The present invention teaches the simplified/cost-effective formation of platform cooling channels that have complex geometries and effective platform coverage. Whereas before, complex geometries necessarily meant a costly investment casting process or the like, the present application teaches methods by which cooling channels having complex design may be formed through machining and/or simplified casting processes. Finally, the present application teaches a method by which the platform may be cooled using interior channels that do not vent directly into the hot gas-path from the platform itself As stated, this "recycling" of coolant generally increases the efficiency of its usage, which increases the efficiency of the engine.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations are not provided or discussed in detail, though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A platform cooling arrangement for a turbine rotor blade having a platform at an interface between an airfoil and a root, wherein the rotor blade includes an interior cooling passage that extends from the root to at least the approximate radial height of the platform and comprises, in operation, a high-pressure coolant region and a low-pressure coolant region, and wherein, along the side of the platform that corresponds with a pressure face of the airfoil, the platform comprises a topside, which extends from the airfoil to a pressure side slashface, and an underside; the platform cooling arrangement comprising:
   an airfoil manifold that resides in the platform, near the junction of the pressure face of the airfoil and the platform;
   a slashface manifold that resides in the platform, near the pressure side slashface;
   a high-pressure connector that connects the airfoil manifold to the high-pressure coolant region of the interior cooling passage;
   a low-pressure connector that connects the slashface manifold to the low-pressure coolant region of the interior cooling passage; and
   cooling apertures, the cooling apertures comprising apertures that extend from a starting point along the pressure side slashface to a connection with the airfoil manifold, bisecting the slashface manifold therebetween; and
   non-integral plugs that reside in at least one of the following: the cooling apertures, the high-pressure connector; and the low-pressure connector;
   wherein the plugs comprise predetermined configurations and placement such that, during operation, a desired flow pattern of coolant through the platform is achieved.

2. The platform cooling arrangement according to claim 1, wherein the airfoil manifold comprises a first channel formed in the underside of the platform that is enclosed by a first non-integral manifold plate, and the slashface manifold comprises a second channel formed in the underside of the platform that is enclosed by a second non-integral manifold plate;
   wherein the first and second manifold plates define the underside of the platform along the first and second channels; and
   wherein the high-pressure coolant region of the interior cooling passage comprises an upstream portion of the interior cooling passage, and the low-pressure coolant region of the interior cooling passage comprises a downstream portion of the interior cooling passage.

3. The platform cooling arrangement according to claim 1, wherein:
   the airfoil manifold comprises an arch-like shaped profile that approximately corresponds to the profile contour of the pressure face of the airfoil and resides offset therefrom, the airfoil manifold being offset toward the pressure side slashface;
   the slashface manifold comprises an approximate linear shape that is offset slightly from the pressure side slashface, the slashface manifold being offset toward the airfoil; and
   the slashface manifold extends axially from an axial position near a trailing edge of the airfoil to an axial position near a leading edge of the airfoil.

4. The platform cooling arrangement according to claim 1, wherein the airfoil manifold resides just outboard of the underside of the platform and has a longitudinal axis that is approximately parallel to the planar topside of the platform; and
   wherein the slashface manifold resides just outboard of the underside of the platform and has a longitudinal axis that is approximately parallel to the planar topside of the platform.

5. The platform cooling arrangement according to claim 3, wherein the high-pressure connector extends linearly and in an approximate circumferential direction from the pressure side slashface to a junction with the high-pressure coolant region of the interior cooling passage, the linear path of the high-pressure connector being predetermined such that it bisects the slashface manifold and the airfoil manifold before connecting with the high-pressure coolant region of the interior cooling passage;

wherein the low-pressure connector extends linearly in an approximate circumferential direction from the pressure side slashface to a junction with the low-pressure coolant region of the interior cooling passage, the linear path of the low-pressure connector being predetermined such that it bisects the slashface manifold before connecting with the low-pressure coolant region of the interior cooling passage; and wherein the cooling apertures extend from the pressure side slashface in an approximate circumferential direction along a predetermined path such that each bisects the slashface manifold and then forms a junction with the airfoil manifold.

6. The platform cooling arrangement according to claim 3, wherein the high-pressure connector extends linearly from a suction side slashface to a junction with the airfoil manifold, the linear path of the high-pressure connector being predetermined such that the high-pressure connector bisects the high-pressure coolant region of the interior cooling passage before connecting with the airfoil manifold;

wherein the low-pressure connector extends linearly from the suction side slashface to a junction with the slashface manifold, the linear path of the low-pressure connector being predetermined such that the low-pressure connector bisects the low-pressure coolant region of the interior cooling passage before connecting with the slashface manifold; and wherein the cooling apertures extend from the pressure side slashface in an approximate circumferential direction along a predetermined path such that each bisects the slashface manifold and then forms a junction with the airfoil manifold.

7. The platform cooling arrangement according to claim 5, wherein the high-pressure connector comprises an axial position along the pressure side slashface that approximately coincides with the axial midpoint of the pressure side slashface; and wherein at least a plurality of the cooling apertures are formed forward of the high-pressure connector and at least a plurality of cooling apertures are formed aft of the high-pressure connector.

8. The platform cooling arrangement according to claim 7, wherein at least four of the cooling apertures are formed forward of the high-pressure connector and at least four cooling apertures are formed aft of the high-pressure connector.

9. The platform cooling arrangement according to claim 3, wherein the airfoil manifold and the slashface manifold each comprise a cross-sectional flow area larger than each of the high-pressure connector and low-pressure connector, and each of the high-pressure connector and the low-pressure connector comprise a cross-sectional flow area larger than each of the cooling apertures; and wherein the cooling apertures comprise varying cross-sectional flow areas that are configured to meter the flow of coolant such that a desired flow pattern of coolant through the cooling apertures is achieved.

10. The platform cooling arrangement according to claim 3, wherein each of the non-integral plugs comprise one of a full plug and a partial plug, wherein the full plug comprises a plug that is configured to block substantially all of the cross-sectional flow area of the coolant passage in which the full plug is located, and wherein the partial plug comprises a plug that blocks a partial amount the cross-sectional flow area of the coolant passage in which the partial plug is located; and wherein each of the non-integral plugs comprises one of a slashface plug, which resides along either the pressure side slashface or a suction side slashface of the platform, and a mid-channel plug, which resides in the interior of the platform.

11. The platform cooling arrangement according to claim 10, wherein each of the cooling apertures, the high-pressure connector; and the low-pressure connector includes one of the slashface plugs; and wherein the slashface plugs comprise full plugs.

12. The platform cooling arrangement according to claim 10, wherein the cooling apertures, the high-pressure connector; and the low-pressure connector include slashface plugs;

wherein the slashface plugs comprises partial plugs such that the cooling apertures, the high-pressure connector, and the low-pressure connector comprise slashface outlets;

wherein the partial plugs are configured to provide a predetermined cross-sectional flow area through the slashface outlets;

the predetermined cross-sectional flow area corresponds to a desired coolant impingement characteristic, such that, during operation, the slashface outlets exhaust an impinged flow of coolant against a platform slashface of a neighboring rotor blade.

13. The platform cooling arrangement according to claim 10, wherein the cooling apertures, the high-pressure connector; and the low-pressure connector include slashface plugs;

wherein the slashface plugs comprises partial plugs such that the cooling apertures, the high-pressure connector, and the low-pressure connector comprise slashface outlets;

wherein the partial plugs are configured to provide a predetermined cross-sectional flow area through the slashface outlets;

the predetermined cross-sectional flow area corresponds to a desired coolant metering characteristic.

14. The platform cooling arrangement according to claim 13, wherein the high-pressure connector contains a mid-channel plug that is a full plug; and wherein the mid-channel plug resides between the airfoil manifold and the slashface manifold.

15. The platform cooling arrangement according to claim 13, wherein the high-pressure connector contains a mid-channel plug that is a partial plug; and wherein the mid-channel plug, upon installation, is configured to reduce the cross-sectional flow area through the high-pressure connector to a predetermined cross-sectional flow area; and wherein the predetermined cross-sectional flow area corresponds to a desired coolant metering characteristic.

16. A method of fabricating a platform cooling arrangement in a turbine rotor blade having a platform at an interface between an airfoil and a root, wherein the rotor blade includes an interior cooling passage that extends from the root to at least the approximate radial height of the platform and comprises, in operation, a high-pressure coolant region and a low-pressure coolant region, and wherein, along the side of the platform that corresponds with a pressure face of the airfoil, the platform comprises a topside, which extends from the airfoil to a pressure side slashface, and an underside; the method including the steps of:

forming an airfoil manifold that resides in the platform, near the junction of the pressure face of the airfoil and the platform;

forming a slashface manifold that resides in the platform, near the pressure side slashface;

machining a high-pressure connector that extends linearly and in an approximate circumferential direction from the pressure side slashface to a junction with the high-pressure coolant region of the interior cooling passage, the linear path of the high-pressure connector being machined along a predetermined path such that the high-pressure connector bisects the slashface manifold and the airfoil manifold before connecting with the high-pressure coolant region of the interior cooling passage;

machining a low-pressure connector that extends linearly in an approximate circumferential direction from the pressure side slashface to a junction with the low-pressure coolant region of the interior cooling passage, the linear path of the low-pressure connector being machined along a predetermined path such that it bisects the slashface manifold before connecting with the low-pressure coolant region of the interior cooling passage;

machining cooling apertures that extend in an approximate circumferential direction from the pressure side slashface to a junction with the airfoil manifold, the path of the cooling apertures being machined along a predetermined path such that each bisects the slashface manifold before connecting with the airfoil manifold; and installing plugs within at least one of the cooling apertures, the high-pressure connector; and the low-pressure connector;

wherein the configurations and locations of the plugs are configured such that a desired flow pattern of coolant through the platform is achieved.

17. The method according to claim 16, wherein:

the step of forming the airfoil manifold comprises machining a first channel in the underside of the platform and enclosing the first channel with a first manifold plate; and the step of forming the slashface manifold comprises machining a second channel in the underside of the platform and enclosing the second channel with a second manifold plate;

the first and second manifold plates define the underside of the platform along the first and second channels; and the high-pressure coolant region of the interior cooling passage comprises an upstream portion of the interior cooling passage, and the low-pressure coolant region of the interior cooling passage comprises a downstream portion of the interior cooling passage.

18. The method according to claim 16, wherein:

the airfoil manifold is formed to include an arch-like shaped profile that approximately corresponds to the profile contour of the pressure face of the airfoil and resides offset therefrom, the airfoil manifold being offset toward the pressure side slashface;

the slashface manifold is formed to include an approximate linear shape that is offset from the pressure side slashface, the slashface manifold being offset toward the airfoil; and the slashface manifold extends axially from an axial position near a trailing edge of the airfoil to an axial position near a leading edge of the airfoil.

19. The method according to claim 16, wherein the airfoil manifold resides just outboard of the underside of the platform and has a longitudinal axis that is approximately parallel to the planar topside of the platform; and wherein the slashface manifold resides just outboard of the underside of the platform and has a longitudinal axis that is approximately parallel to the planar topside of the platform.

20. The method according to claim 16, wherein:

the step of forming the airfoil manifold comprises casting a first channel in the underside of the platform and enclosing the first channel with a first manifold plate; and the step of forming the slashface manifold comprises casting a second channel in the underside of the platform and enclosing the second channel with a second manifold plate;

upon installation, the first and second manifold plates define the underside of the platform along the first and second channels; and the high-pressure coolant region of the interior cooling passage comprises an upstream portion of the interior cooling passage, and the low-pressure coolant region of the interior cooling passage comprises a downstream portion of the interior cooling passage.

21. The method according to claim 16, wherein the high-pressure connector comprises an axial position along the pressure side slashface that approximately coincides with the axial midpoint of the pressure side slashface; and wherein at least a plurality of the cooling apertures are formed forward of the high-pressure connector and at least a plurality of cooling apertures are formed aft of the high-pressure connector.

22. The method according to claim 16, wherein the airfoil manifold and the slashface manifold each comprise a cross-sectional flow area larger than each of the high-pressure connector and low-pressure connector, and each of the high-pressure connector and the low-pressure connector comprise a cross-sectional flow area larger than each of the cooling apertures; and wherein the cooling apertures comprise varying cross-sectional flow areas that are configured to meter the flow of coolant such that a desired flow pattern of coolant through the cooling apertures is achieved.

23. The method according to claim 16, wherein each of the plugs comprise one of a full plug and a partial plug, wherein the full plug comprises a plug that is configured to block substantially all of the cross-sectional flow area of the coolant passage in which the full plug is located, and wherein the partial plug comprises a plug that blocks a partial amount the cross-sectional flow area of the coolant passage in which the partial plug is located; and wherein each of the plugs comprises one of a slashface plug, which resides along either the pressure side slashface or a suction side slashface of the platform, and a mid-channel plug, which resides in the interior of the platform.

24. The method according to claim 23, wherein each of the cooling apertures, the high-pressure connector; and the low-pressure connector includes one of the slashface plugs; and wherein the slashface plugs comprise full plugs.

25. The method according to claim 23, wherein the cooling apertures, the high-pressure connector, and the low-pressure connector include slashface plugs;

wherein the slashface plugs comprises partial plugs such that the cooling apertures, the high-pressure connector, and the low-pressure connector comprise slashface outlets;

wherein the partial plugs are configured to provide a predetermined cross-sectional flow area through the slashface outlets;

the predetermined cross-sectional flow area corresponds to a desired coolant impingement characteristic, such that, during operation, the slashface outlets exhaust an impinged flow of coolant against a platform slashface of a neighboring rotor blade.

26. The method according to claim 23, wherein the cooling apertures, the high-pressure connector; and the low-pressure connector include slashface plugs;
  wherein the slashface plugs comprises partial plugs such that the cooling apertures, the high-pressure connector, and the low-pressure connector comprise slashface outlets;
  wherein the partial plugs are configured to provide a predetermined cross-sectional flow area through the slashface outlets;
  the predetermined cross-sectional flow area corresponds to a desired coolant metering characteristic.

27. The method according to claim 23, wherein the high-pressure connector contains a mid-channel plug that is a full plug; and
  wherein the mid-channel plug resides between the airfoil manifold and the slashface manifold.

28. The method according to claim 23, wherein the high-pressure connector contains a mid-channel plug that is a partial plug; and
  wherein the mid-channel plug, upon installation, is configured to reduce the cross-sectional flow area through the high-pressure connector to a predetermined cross-sectional flow area; and
  wherein the predetermined cross-sectional flow area corresponds to a desired coolant metering characteristic.

29. A method of fabricating a platform cooling arrangement in a turbine rotor blade having a platform at an interface between an airfoil and a root, wherein the rotor blade includes an interior cooling passage that extends from the root to at least the approximate radial height of the platform and comprises, in operation, a high-pressure coolant region and a low-pressure coolant region, and wherein, along the side of the platform that corresponds with a pressure face of the airfoil, the platform comprises a planar topside, which extends from the airfoil to a pressure side slashface, and an underside; the method including the steps of:
  forming an airfoil manifold by machining a first channel in the underside of the platform and enclosing the first channel with a first manifold plate; and
  forming a slashface manifold by machining a second channel in the underside of the platform and enclosing the second channel with a second manifold plate;
  machining a high-pressure connector that extends linearly and in an approximate circumferential direction from a suction side slashface to a junction with the airfoil manifold, the linear path of the high-pressure connector being machined along a predetermined path such that the high-pressure connector bisects the high-pressure coolant region of the interior cooling passage before connecting with the airfoil manifold;
  machining a low-pressure connector that extends linearly in an approximate circumferential direction from the pressure side slashface to a junction with the low-pressure coolant region of the interior cooling passage, the linear path of the low-pressure connector being machined along a predetermined path such that it bisects the slashface manifold before connecting with the low-pressure coolant region of the interior cooling passage; and
  machining cooling apertures that extend in an approximate circumferential direction from the pressure side slashface to a junction with the airfoil manifold, the path of the cooling apertures being machined along a predetermined path such that each bisects the slashface manifold before connecting with the airfoil manifold; and
  installing plugs within at least one of the cooling apertures, the high-pressure connector; and the low-pressure connector;
  wherein the configurations and locations of the plugs are configured such that a desired flow pattern of coolant through the platform is achieved.

* * * * *